United States Patent [19]

Ungerer

[11] 3,944,693

[45] Mar. 16, 1976

[54] FLOCKED WEATHERSTRIP

[75] Inventor: Aaron J. Ungerer, Schenectady, N.Y.

[73] Assignee: The Standard Products Company, Cleveland, Ohio

[22] Filed: June 10, 1974

[21] Appl. No.: 477,621

Related U.S. Application Data

[63] Continuation-in-part of Ser. No. 264,910, June 21, 1972, abandoned.

[52] U.S. Cl. ...................... 428/89; 49/375; 427/23; 427/201; 427/206; 428/90; 428/96; 428/97

[51] Int. Cl.$^2$... B05D 1/14; B05D 1/16; B32B 33/00

[58] Field of Search ................ 117/16, 17.5, 17, 33; 161/64, 63; 49/375, 489, 495; 428/89, 90, 96, 97; 427/23, 201, 206

[56] References Cited

UNITED STATES PATENTS

| | | | |
|---|---|---|---|
| 2,152,077 | 3/1939 | Meston et al. | 41/36 |
| 2,328,904 | 9/1943 | Hiers | 117/17 |
| 2,368,706 | 2/1945 | Fountain | 28/80 |
| 2,384,951 | 9/1945 | Millar | 117/13 |
| 2,428,006 | 9/1947 | Best | 161/63 |
| 2,503,887 | 4/1950 | Schlegel | 161/63 |
| 2,621,104 | 12/1952 | Prew | 21/25 |
| 2,636,837 | 4/1953 | Summers | 154/123 |
| 2,709,668 | 5/1955 | Thompson | 161/63 X |
| 2,821,430 | 1/1958 | Grede | 161/63 X |
| 3,043,669 | 7/1972 | Charles | 23/253 |
| 3,171,484 | 3/1965 | Thal | 161/63 |
| 3,518,154 | 6/1970 | Broadhurst | 161/64 |
| 3,528,874 | 9/1970 | Spencer | 161/63 |
| 3,565,742 | 2/1971 | Stephens et al. | 161/64 |
| 3,616,135 | 10/1971 | Tesainer | 117/33 X |
| 3,723,231 | 3/1973 | Clay et al. | 161/64 |
| 3,745,053 | 10/1973 | Johnson et al. | 161/63 |

FOREIGN PATENTS OR APPLICATIONS

| | | | |
|---|---|---|---|
| 2,005,535 | 1970 | Germany | 427/206 |

*Primary Examiner*—Ronald H. Smith
*Assistant Examiner*—Shrive P. Beck
*Attorney, Agent, or Firm*—Meyer, Tilberry & Body

[57] ABSTRACT

A flocked weatherstrip is provided for sealing the space between two relatively movable closure members such as sliding doors. The weatherstrip includes a plastic base strip mounting on one of the closure members and having a body of elongated fibers attached to a surface thereof for sealing engagement with the other closure member. The body of flocked fibers includes two groups of interspersed elongated fibers of common material having different deniers and lengths, whereby the body of fibers is of greatest density adjacent the surface of the strip.

6 Claims, 7 Drawing Figures

FIG. 1
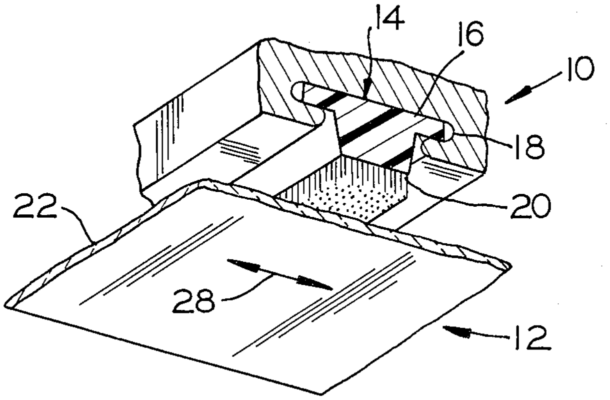
FIG. 2
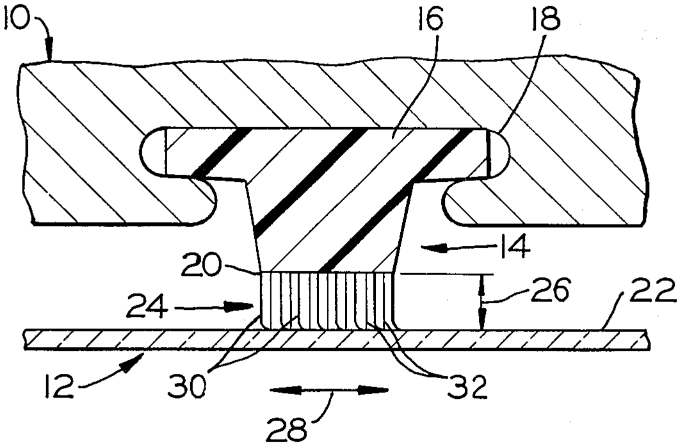
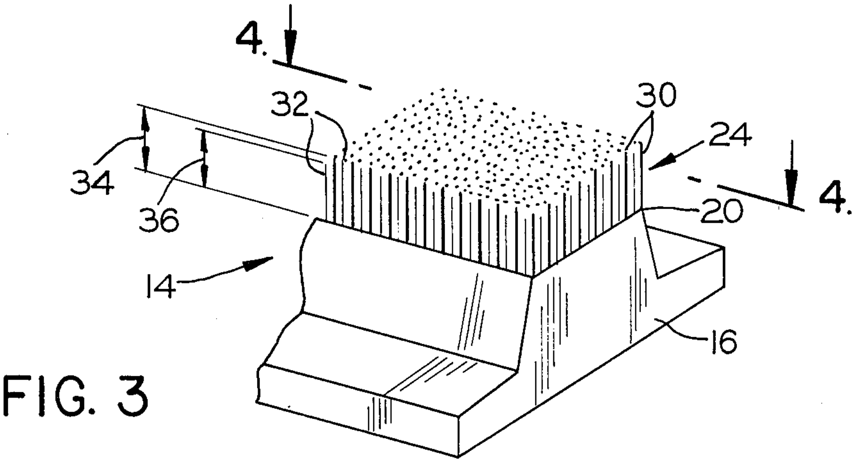
FIG. 3
[redacted]

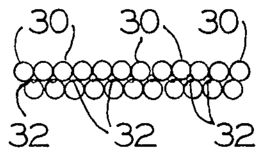
FIG. 4
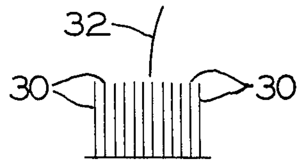
FIG. 5
FIG. 6
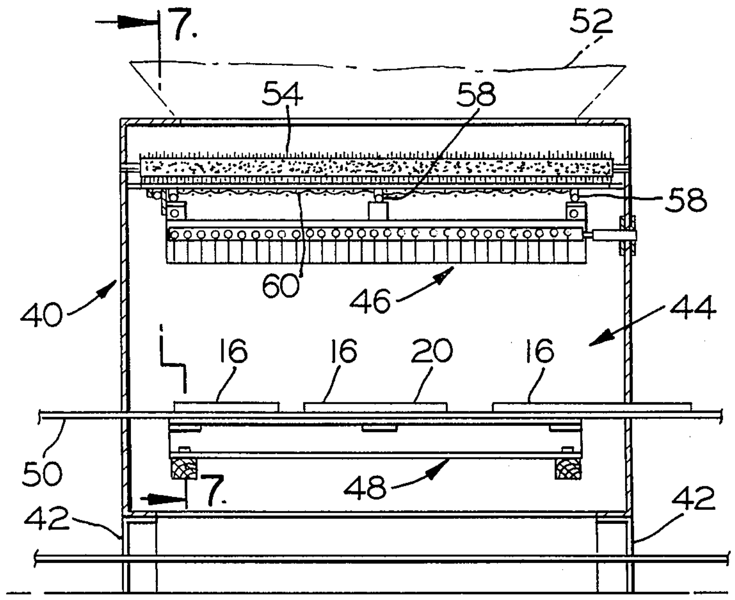
FIG. 7
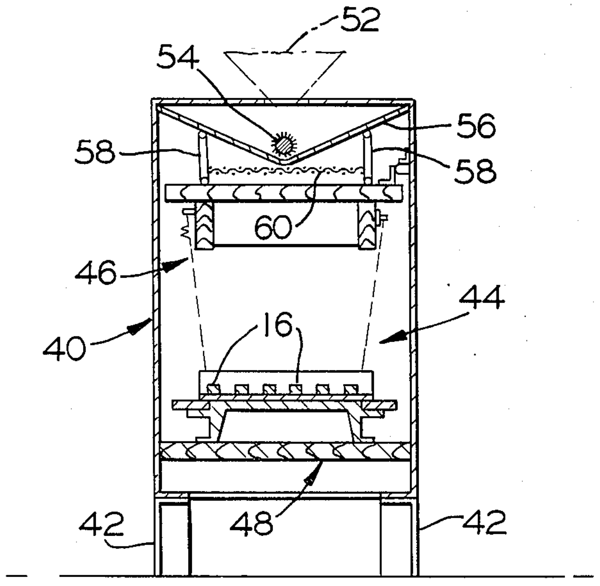

FLOCKED WEATHERSTRIP

BACKGROUND OF THE INVENTION

This application is a continuation-in-part of my application Ser. No. 264,910 filed June 21, 1972 now abandoned.

The present invention relates to weatherstrips and, more particularly, to an improved flocked fiber weatherstrip for sealing the space between relatively movable closure members.

Generally, weatherstripping provided between relatively slideable closure members, such as sliding glass doors, serves to minimize rattling or vibration, to minimize friction during sliding movement, to exclude moisture and water, to provide variable clearance for assembly of the closure members and, most importantly, to prevent infiltration of air through the space therebetween. Specifications for flocked fiber weatherstripping require that air infiltration characteristics be measured when the flocked pile is compressed to eighty percent of the free overall height of the weatherstrip. Such compression causes the fibers to bend laterally of their free disposition and relative to one another, whereby passages for air through the fiber pile are created reducing the resistance to air infiltration. Accordingly, it becomes important to minimize the decrease in resistance to air infiltration which results from fiber distortion caused by such compression.

To produce a flocked pile on the surface of a weatherstrip body, the surface is provided with an adhesive coating and elongated fibers of the same length and having uniform and very small diameters are deposited electrostatically on the surface of the body. With this procedure, the propelling force on each fiber is limited and it is not possible to tightly compress the fibers laterally of the fiber axes on the surface of the body. In other words, the number of fibers which can be electrostatiically deposited on the surface of the body is limited. This, together with distortion resulting from fiber compression, makes it very difficult to achieve a desired density and to meet air filtration specifications.

Heretofore, efforts have been made to increase fiber density in weatherstrips of the foregoing character by either increasing or decreasing the denier of the fibers used. The number of fibers which can be electrostatically deposited decreases with increasing denier. The reason for this, by way of example, is believed to be due to the fact that for a given area, a larger number of cylindrical objects one inch in diameter can be placed in the area than can cylindrical objects one foot in diameter. Therefore, by increasing the fiber denier, density is reduced and resistance to air infiltration is reduced. Decreasing the denier of the fibers results in a fiber pile having less than a desired stiffness to resist rattling, vibration and the like. Moreover, smaller denier fibers present problems with regard to obtaining a desired density when they are electrostatically deposited. In this respect, when there are already a large number of small diameter fibers on the surface of the weatherstrip body, additional fibers of the same diameter must pass between the fibers and into the spaces therebetween in order to stick in the adhesive on the surface of the body. The frictional resistance of additional fibers passing through fibers which are already deposited causes very small denier fibers to bend and hang up before they strike the adhesive on the surface of the article. This, of course, reduces the density which would be obtained if the fibers could penetrate to the surface of the weatherstrip body. Accordingly, such previous efforts have not produced a flocked fiber weatherstrip having an optimum fiber density, crush resistance and resistance to air infiltration under test specifications.

SUMMARY OF THE INVENTION

In accordance with the present invention, a flocked fiber weatherstrip is provided by which the above problems are overcome and desirable air infiltration and density characteristics are obtained. In this respect, the weatherstrip of the present invention includes a flocked pile defined by interspersed first and second pluralities of elongated fibers. The first plurality of fibers each have a longitudinal axis, opposite end portions, and a common diameter and length. The second plurality of fibers each have a longitudinal axis, opposite end portions, and a common second diameter and length less than the first diameter and length.

The first plurality of fibers are propelled toward an adhesive-coated surface of the body of the weatherstrip with their longitudinal axes extending substantially perpendicular to the surface so that one end portion thereof will be embedded in the adhesive. Once a flocked pile is formed on the surface of the body from the first plurality of fibers, the second plurality of fibers are propelled toward the surface with their longitudinal axes extending generally perpendicular to the surface so that one end portion thereof will be embedded in the adhesive. The first plurality of fibers are distributed throughout the surface of the weatherstrip body, and the second plurality of fibers are distributed throughout the surface of the article and throughout the first plurality of fibers. The larger diameters of the first plurality of fibers provides spaces therebetween which can be penetrated by the smaller diameter fibers of the second plurality without the frictional resistance encountered when all of the fibers are of the same diameter. Moreover, the shorter length of the second plurality of fibers makes it possible for them to be propelled through the first plurality of fibers to embed in the adhesive without bending. The resulting flocked fiber weatherstrip has a flocked pile with a greater density adjacent the surface of the body than adjacent the outer surface of the flocked pile as defined by the larger and longer diameter fibers. Moreover, the smaller fibers laterally support the larger and longer fibers thereby increasing the resistance to fiber deflection and distortion resulting from compression of the fiber pile during use. This in turn increases resistance to air infiltration across the fiber pile.

In a preferred arrangement, the first and second plurality of fibers are formed of a common material, with the second plurality of fibers having a substantially smaller denier and length than the first plurality of fibers. In the preferred arrangement, the denier of the second plurality of fibers is fifteen to forty percent of the denier of the first plurality of fibers. Generally, this means that the diameter of the second plurality of fibers is around twenty-five to sixty percent of the diameter of the first plurality of fibers. Preferably, the denier and diameter of the second plurality of fibers are in the lower limits of these ranges in order to achieve optimum density and desirable air infiltration characteristics. Preferably, the length of the second plurality of fibers is at least equal to the resultant height of the fiber pile when the free height of the weatherstrip including the height of the body and the free height of the fibers is compressed to eighty percent of the free height. In other words, when the free height of the weatherstrip is compressed 20%.

It is a principal object of the present invention to provide an improved flocked pile weatherstrip.

It is a further object of the present invention to provide a flocked pile weatherstrip having improved density and air infiltration characteristics.

It is also an object of the present invention to provide a flocked pile weatherstrip having a greater density adjacent the surface of the weatherstrip body than adjacent the outer surface of the pile.

It is an additional object of the present invention to provide a flocked fiber weatherstrip including interspersed first and second fibers and in which the denier and length of the first fibers is greater than the denier and length of the second fibers.

BRIEF DESCRIPTION OF THE DRAWING

The foregoing objects, and others, will in part be obvious and in part pointed out more fully hereinafter in conjunction with the description of a preferred embodiment of the invention illustrated in the accompanying drawing and in which:

FIG. 1 is a perspective view of a pair of cooperable closure members provided with a weatherstrip made in accordance with the present invention;

FIG. 2 is an enlarged cross-sectional view of the weatherstrip and closure members shown in FIG. 1;

FIG. 3 is a perspective view showing the weatherstrip having the improved flock pile of the present invention on a surface of the weatherstrip body;

FIG. 4 is a partial plan view looking generally in the direction of arrows 4—4 of FIG. 3;

FIG. 5 is a diagrammatic illustration showing relationships between adjacent small denier fibers of the same length;

FIG. 6 is a side elevational view of an electrostatic flocking apparatus; and,

FIG. 7 is a cross-sectional elevational view looking generally in the direction of arrows 7—7 of FIG. 6.

Referring now to the drawings, wherein the showings are for the purpose of illustrating a preferred embodiment of the invention only and not for the purpose of limiting the invention, FIGS. 1 and 2 show portions of a pair of cooperating relatively slideable closure members 10 and 12 which may, for example, be components of a sliding glass door assembly. In such an assembly, member 10 is a frame element of one door panel and member 12 is the glass pane of the other door panel. Member 10 carries a weatherstrip 14 which, in the embodiment shown, includes an elongate body 16 of a suitable synthetic plastic material, such as vinyl. Body 16 is generally T-shaped in cross section and is received in a correspondingly contoured recess 18 in member 10. While the T-shaped body configuration and mounting arrangement is preferred, it will be appreciated that other body structures and mounting arrangements can be readily employed. Body 16 has an outer surface 20 which is longitudinally coextensive therewith and which is spaced from and faces planar surface 22 of closure member 12. It will be appreciated that the length of body 16 and thus surface 20 is determined by the length of closure members 10 and 12. The lateral dimensions of such weatherstrips are quite small relative to the length dimension and vary depending on the use of the weatherstrip. By way of example, surface 20 of a strip for sealing sliding glass doors may have a width of about 0.100 inch.

As best seen in FIG. 2, outer surface 20 of body 16 is provided with a pile 24 of flocked fiber sealing material. The structure of the flocked fiber pile is described in greater detail hereinafter. When body 16 is mounted on member 10, outer surface 20 is spaced from surface 22 of closure member 12 a given distance 26. In the embodiment shown, closure members 10 and 12 are relatively slideable in opposite directions as indicated by double-head arrow 28, and the flocked fibers of pile 24 sealingly engage surface 22 to minimize the infiltration of air laterally across the weatherstrip.

FIGS. 3 and 4 of the drawing show the structure of the flocked fiber pile 24. In this respect, it will be seen that pile 24 is comprised of a first plurality of fibers 30 and a second plurality of fibers 32. Fibers 30 and 32 extend upwardly from outer surface 20 of weatherstrip body 16 and have inner ends adjacent outer surface 20 and outer ends spaced therefrom. Further, all of the fibers 30 are of substantially the same length between the opposite ends thereof and are of substantially the same diameter along their lengths. Similarly, all of the fibers 32 are of substantially the same length between the opposite ends thereof and are of substantially the same diameter along their lengths. Fibers 30 and 32 are electrostatically deposited on outer surface 20 of body 16 and are retained thereon such as by an adhesive coating on the surface which sets subsequent to the electrostatic deposition. Alternatively, it will be recognized that it is also possible to heat body 16 when the latter is of a thermoplastic material so that at least surface 20 thereof is soft enough to cause fibers 30 and 32 to adhere thereto during electrostatic deposition.

Preferably, fibers 30 and 32 are formed of a common material, and the preferred material is nylon. It will be appreciated, however, that other natural and synthetic fibers, such as wool, cotton or rayon may be used to carry out the principles of the present invention. As is well known, nylon fibers can be produced by extruding nylon into strands having a desired cross-sectional dimension and then chopping the strands into the desired length. As is shown in FIG. 3, fibers 30 have a length 34 between the opposite ends thereof, and fibers 32 have a length 36 between the opposite ends thereof. Fibers 32 are shorter in length than fibers 30 and length 36 preferably is at least equal to the height of the fiber pile when the fiber pile is compressed such that the overall height of the weatherstrip is 80% of the uncompressed or free height of the weatherstrip, as described hereinafter. Further, it is preferred to provide for length 36 to correspond to distance 26, as shown in FIG. 2. Accordingly, all of the fibers 30 and 32 span the space between body surface 20 and panel surface 22. As shown in FIG. 4 of the drawing, the longer fibers 30 have a diameter greater than the diameter of the shorter fibers 32, and the latter fibers are disposed in the spaces between adjacent fibers 30, thus minimizing the open space that would otherwise exist between fibers 30.

In accordance with a preferred arrangement, body 16 has a height between the base thereof and surface 20 of 0.110 inch. Fibers 30 have a denier of from 15 to 18 and a length between the opposite ends thereof of from 0.05 inch to 0.110 inch. Fibers 32 have a denier of 3 to 6 and a length between the opposite ends thereof of from 0.02 inch to 0.07 inch. As mentioned above, the preferred length of fibers 32 is at least equal to the compressed height of the weatherstrip. In this respect, for example, if body 16 has a height of 0.110 inch and fibers 30 have a length of 0.110 inch, the free height of the weatherstrip is 0.220 inch. When compressed to 80% of this height, the overall height of the weatherstrip is 0.176 inch. Of this dimension 0.066 inch is fiber height. Thus, when fibers 30 are 0.110 inch long, fibers 32 preferably are 0.066 or 0.070 inch long. Generally, when fibers 30 and 32 are formed of a common material, the denier of fibers 32 will be 15% to 40% of the denier of fibers 30, and for the body size and lengths given above the length of fibers 32 generally will be 40 to 60% of the length of the fibers 30 depending on the length of fibers 30. The body dimension of 0.110 inch is generally a fixed dimension for such weatherstrips, but it will be appreciated that other body height dimensions could be employed. It will be further appreciated that the larger denier fibers are juxtaposed longitudinally and laterally of surface 20, and that the smaller denier fibers occupy the spaces therebetween to increase the density of the lower portion of the pile as defined by the height of the shorter fibers.

As mentioned hereinabove, fibers 30 are longer than fibers 32, and fibers 32 are preferably of a length at least equal to the distance between outer surface 20 of body 16 and panel surface 22. As further mentioned above, this length relationship provides for all of the fibers 30 and 32 to span the space between surfaces 20 and 22. The longer lengths of fibers 30 provide for the outer ends thereof to bend into sliding engagement with panel surface 22, as shown in FIG. 2, and the smaller diameter fibers therebetween provide lateral support for the larger fibers against deflection in response to compression and sliding engagement with panel surface 22. It will be appreciated, therefore, that the combination of the larger and smaller denier fibers increase the density of the fiber pile between surfaces 20 and 22 with respect to the density which would be achieved if all of the fibers were of the larger denier. Moreover, it will be appreciated that the longer lengths and larger denier of fibers 30 provides the flocked fiber pile with a desired resistance to crushing, and the smaller denier and shorter length of fibers 32 together with fibers 30 provides optimum density and stability and, thus, optimum air infiltration characteristics when the flocked pile is compressed to 80% of the free overall height of the weatherstrip.

Fibers 30 and 32 are deposited on weatherstrip body 16 electrostatically and in a manner such as is shown and described in U.S. Pat. No. 3,269,356 to Friderici which is hereby incorporated herein by reference. An apparatus for accomplishing such deposition in accordance with the teachings of the Friderici patent is shown in FIGS. 6 and 7. Referring to the latter Figures, the apparatus includes a generally rectangular housing 40 having depending supporting legs 42. Interior area 44 of housing 40 defines a flocking chamber, and upper and lower electrode assemblies 46 and 48 are positioned in chamber 44 in parallel relationship to one another. An electrostatic field is generated between the electrode assemblies when an electrical potential is applied thereto.

A movable conveyor 50 extends through flocking chamber 40 and supports elongated weatherstrip bodies 16 to be flocked. As previously explained, outer surfaces 20 of bodies 16 are coated with a suitable adhesive capable of adhesively bonding fibers thereto. Fibers 30 are introduced into housing 40 from hopper 52, and a rotatably driven brush 54 and inner hopper 56 cooperate to dispense the fibers into chamber 44. Spaced apart flexible members 58 suspend a screen 60 in a substantially horizontal position beneath hopper 56. Screen 60 is preferably vibrated so that fibers 30 will be somewhat evenly distributed throughout the screen as the fibers fall therethrough toward upper electrode assembly 46.

Electrode assemblies 46 and 48 generate a substantially uniform electrostatic field so that the fibers are uniformly distributed throughout chamber 44. The fibers will then be deposited on outer surface 20 of bodies 16 in a high and uniform density. More particularly, an alternating electrical potential is applied to upper and lower electrode assemblies 46 and 48, and an electrostatic field having the approximate configuration of the electrode assemblies is generated. The fibers fall into this electrostatic field and become longitudinally aligned with the lines of force extending between the electrode assemblies. The fibers move substantially perpendicular to surface 20 and, eventually, the fibers are propelled downward into the adhesive coated surface 20 and are retained therein with one end portion thereof bonded to the surface by the adhesive. Thus, a uniformly flocked surface is formed.

Due to the close relationship of fibers 30, the flocked pile first produced will have a maximum density and distribution for fibers of the size of fibers 30. Bodies 16 are then moved through another apparatus substantially identical to that described with reference to FIGS. 6 and 7. The second apparatus is supplied only with the smaller denier fibers 32 which are capable of penetrating into the spaces between fibers 30 so that their lower end portions are bonded to the adhesive coated surfaces 20. As shown in FIG. 4, the first operation produces a substantially uniform distribution of fibers 30 which have small spaces therebetween, and the spaces between fibers 30 is filled with fibers 32 by the second operation. This, together with the fiber lengths makes it possible to achieve a greater density in the portion of flocked pile 24 adjacent surface 20 than in the portion adjacent the outer ends of larger fibers 30.

If fibers 32 are quite long, or it is attempted to propel fibers 32 between similar sized fibers which are very closely spaced, fibers 32 would bend as shown in FIG. 5. In this respect, penetration of the fibers between fibers already deposited is frictionally resisted by the previously deposited fibers. This bending of such long fibers will prevent having one end portion thereof penetrate to the adhesive on surface 20 so that the fibers could be bonded thereto. Accordingly, these fibers do not become a permanent part of the pile and fiber density is reduced by the loss thereof. The larger spaces between adjacent fibers 30 resulting from the larger denier thereof enables the smaller denier fibers to penetrate the spaces and reach surface 20.

The arrangement described produces a flocked pile 24 having a greater density adjacent surface 20 of weatherstrip body 16 than adjacent the free outer ends of the flocked pile. This provides a flocked pile weatherstrip having optimum air infiltration characteristics and provides a density for such a weatherstrip which heretofore was not considered possible.

Although the invention has been described with reference to a preferred embodiment, it is obvious that equivalent alterations and modifications will occur to those skilled in the art upon the reading and understanding of this specification. The present invention includes all such equivalent alterations and modifications and is limited only by the scope of the claims.

What is claimed is:

1. In a weatherstrip for sealing the space between cooperable relatively movable closure members, said weatherstrip being mountable on one of said closure members and including an elongate body of synthetic plastic having an outer surface coextensive in length therewith, said outer surface being spaced a given distance from and facing the other of said closure members when said weatherstrip is mounted on said one closure member, flocked fiber on said outer surface and projecting therefrom toward said other closure member for sealing engagement therewith, the improvement comprising: said flocked fiber including a first plurality of fibers distributed throughout said outer surface and having a first denier and a first length, and a second plurality of fibers distributed throughout said first plurality of fibers and having a second denier generally 15 to 40% of said first denier and a second length generally 40 to 60% of said first length.

2. The improvement according to claim 1, wherein said body has a base and a height dimension between said base and outer surface, said height dimension and said first length define a free weatherstrip height dimension, and said second length is at least equal to the resultant height of said first plurality of fibers when said free height is compressed 20%.

3. The improvement according to claim 2, wherein said first length is from about 0.05 to 0.100 inch.

4. The improvement according to claim 2, wherein said first denier is from 15 to 18.

5. The improvement according to claim 5, wherein said second denier is from 3 to 6.

6. The improvement according to claim 1, wherein said first length is from about 0.05 inch to 0.110 inch, said second length is from about 0.02 inch to 0.066 inch, said first denier is from 15 to 18, and said second denier is from 3 to 6.

* * * * *